United States Patent [19]
Burns et al.

[11] Patent Number: 5,180,641
[45] Date of Patent: Jan. 19, 1993

[54] BATTERY CELL BYPASS CIRCUIT

[75] Inventors: James R. Burns, Laguna Beach; Marvin F. Blaski, Whittier, both of Calif.

[73] Assignee: Rockwell International Corporation, Seal Beach, Calif.

[21] Appl. No.: 697,388

[22] Filed: May 9, 1991

[51] Int. Cl.$^5$ .............................................. H01M 2/34
[52] U.S. Cl. .......................................... 429/1; 429/7; 429/61
[58] Field of Search ........................... 429/1, 7, 49, 61

[56] References Cited

U.S. PATENT DOCUMENTS

| | | | |
|---|---|---|---|
| 2,624,033 | 12/1952 | Jacquer | 429/7 X |
| 4,411,967 | 10/1983 | Yano | 429/61 X |
| 4,452,867 | 6/1984 | Confroti | 429/7 |

FOREIGN PATENT DOCUMENTS

| | | | |
|---|---|---|---|
| 53-69315 | 6/1978 | Japan | 429/61 |
| 59-134557 | 8/1984 | Japan | 429/7 |

Primary Examiner—Stephen Kalafut
Attorney, Agent, or Firm—David J. Arthur; Lawrence N. Ginsberg; Charles T. Silberberg

[57] ABSTRACT

A battery cell circuit provides a battery cell having a positive terminal and a negative terminal, and bypass circuitry for allowing current to flow around the battery cell should it fail open. The bypass circuitry includes a first plurality of diodes connected in series between the positive terminal and the negative terminal, with those diodes connected with their forward direction from the positive terminal to the negative terminal, to provide a path for charging current around an open circuit battery cell. Two series sets of parallel diodes are connected between the negative terminal and the positive terminal, with their forward direction from the negative terminal to the positive terminal to provide a bypass path for discharge current to flow around the battery cell in the event if fails open and the bypass circuitry is preferably packaged in a hermetically sealed hybrid module.

7 Claims, 6 Drawing Sheets

BATTERY CELL BYPASS CIRCUIT

BACKGROUND OF THE INVENTION

The present invention relates to high reliability battery systems, and particularly those used in satellites and other environments inaccessible for repair.

Batteries are a major weight item in a spacecraft. Nickel hydrogen ($NiH_2$) batteries are typically used in a spacecraft system as energy storage devices. Conventional energy storage devices use redundant parallel battery strings 11 to attain high reliability operation, as illustrated in FIG. 1. Each battery string includes a plurality of battery cells 13. Parallel battery strings are used because if one of the cells in a particular battery string fails and becomes an open circuit, the entire string of battery cells fails.

SUMMARY OF THE INVENTION

The present invention is a battery cell circuit that includes a battery cell having a positive and negative terminal, and a first plurality of diodes connected in series between the positive terminal and the negative terminal, wherein the diodes are connected with their forward direction from the positive terminal to the negative terminal. A second plurality of diodes is connected in parallel with each other between the negative terminal and intermediate terminal, in which the diodes of the second plurality are connected with their forward direction from the negative terminal to the intermediate terminal. A third plurality of diodes is connected in parallel with each other beteen the intermediate terminal and the positive terminal so that the diodes of the third plurality are connected with their forward direction from the intermediate terminal to the positive terminal.

In a preferred embodiment, the invention is formed in a ceramic hybrid package.

DETAILED DESCRIPTION OF THE PREFERRED EMBODIMENT

The present invention provides paths for current to bypass a particular battery cell if that battery cell fails as an open circuit.

Figure 1:
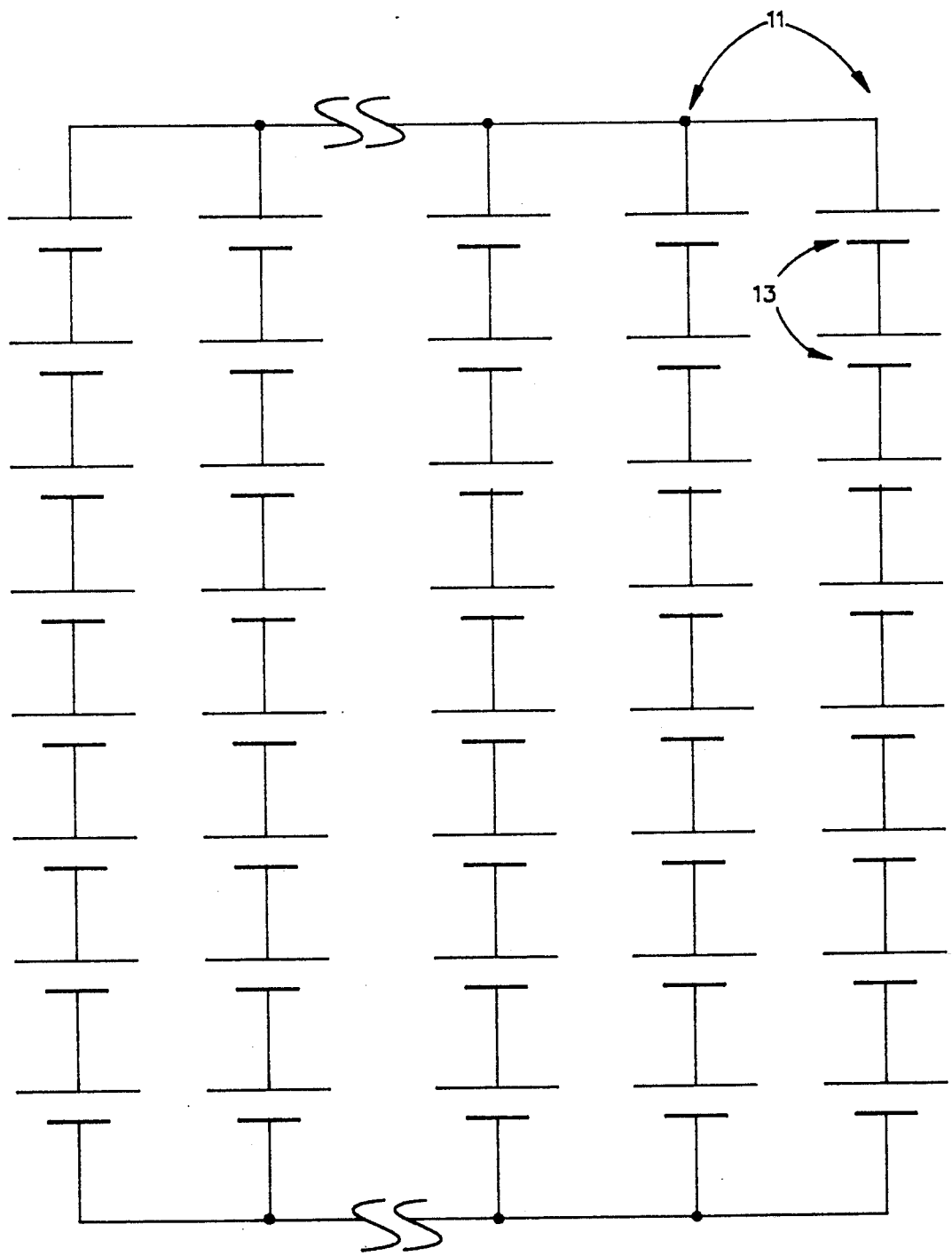
FIG. 1 is a schematic diagram of a conventional, high-reliability battery system incorporating redundant parallel strings of battery cells.
Figure 2:
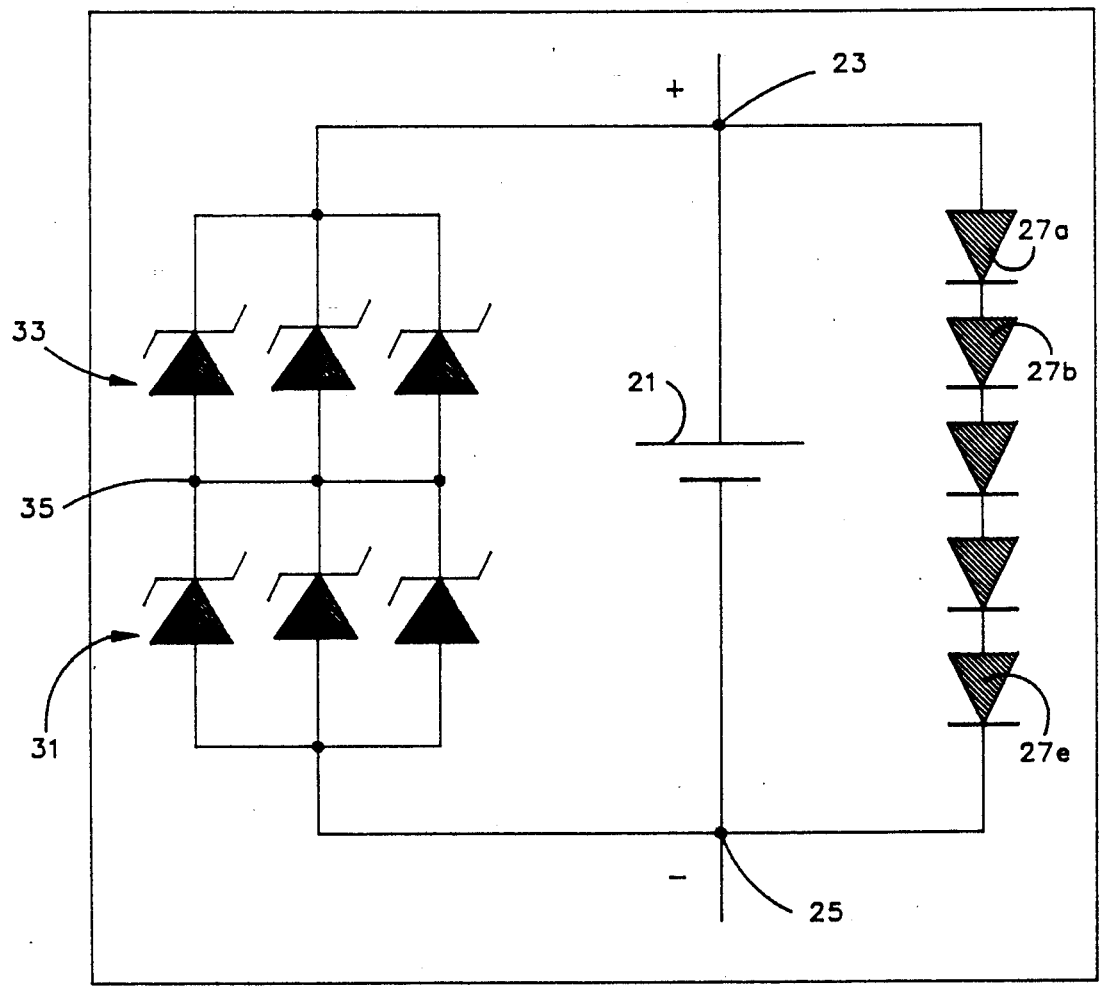
FIG. 2 is a schematic diagram of a battery cell with a bypass circuit constructed according to the invention.

FIG. 2 is a schematic diagram of a battery cell constructed according to the invention. As illustrated, the battery cell circuit includes a battery cell 21 having a positive terminal 13 and a negative terminal 25.

To provide a path for current to bypass the battery cell during battery charging, a plurality of p-n diodes 27a–27e are connected in series with one another, with the series of diodes connected in parallel with the battery cell 21. The diodes 27a–27e are connected with their forward direction from the positive battery terminal to the negative battery terminal. Thus, the cathode of the first diode in the series 27a is connected to the positive terminal 23 of the battery cell, and the anode of the first diode is connected to the cathode of the second diode 27b, and so forth, with the anode of the last diode in the series 27e connected to the negative terminal 25 of the battery.

These diodes of the charging current bypass path may be either conventional p-n junction diodes, or schottky diodes. Using several diodes in series avoids forward biasing the diodes with the normal battery cell voltage when the battery cell is operating properly. For example, a battery cell may have a voltage of approximately 1.5 volts, and p-n junction diode may have a forward bias of 0.6–0.7 volts. When the battery cell is operating normally, a smaller amount of forward biased current will flow if more diodes are added in the series. However, a penalty is paid in the form of greater power dissipation for a given charge current if the battery cell fails open. Thus, in the illustrated embodiment, five diodes are provided in series to minimize the leakage current when the battery cell is operating properly, while not consuming excessive power if the cell should fail open, and the current flow through the discharge bypass path. The actual number of series diodes used in a particular application may be larger or smaller, depending on battery cell characteristics.

A bypass circuit is also provided for use in discharging the battery if the cell should fail open. As illustrated, two series sets 31, 33 of parallel Schottky diodes are provided to ensure that no single point failure occurs. If a single set of parallel diodes were used, a shorted diode would short the battery cell.

The diodes in the discharge current bypass circuit are connected with their forward direction from the negative terminal 25 to the positive terminal 23. In the illustrated embodiment in which two sets of parallel diodes are connected in series, the diodes of the first set 31 have their cathodes connected to the battery cell's negative terminal, and their anodes connected to an intermediate terminal 35. The cathodes of the diodes of the second set 33 are connected to the intermediate terminal, and the anodes are connected to the positive terminal 23 of the battery cell.

In the illustrated embodiment, each parallel set of diodes includes three diodes. This number may be increased or decreased as dictated by the current requirements that would need to be handled during battery discharge. Any value of discharge current may be accommodated by paralleling two or more diodes in each set in the series.

The diodes in each set of parallel diodes should be carefully matched so their forward diode characteristics are as nearly identical as possible. Such diode matching ensures that the current flow through them is balanced. Minimizing power dissipation can be accomplished by using high current capability schottky diodes.

During normal operation of a good battery cell, there will be some minor reverse leakage current of the discharge mode diodes, depending on particular semiconductor die temperatures and other characteristics.

Figure 3:
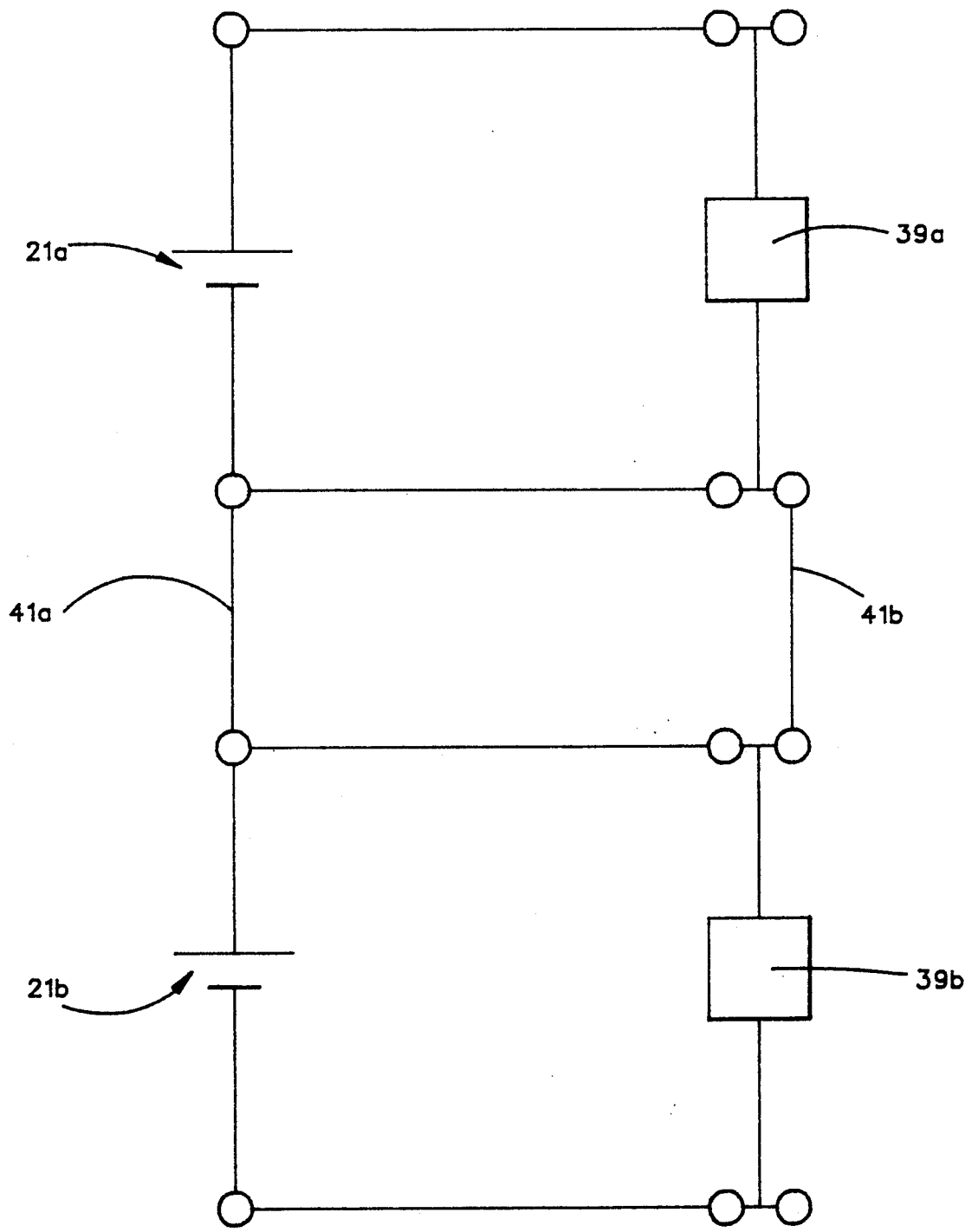
FIG. 3 is a schematic diagram of a pair of battery cells connected in series, each battery cell including a bypass circuit constructed according to the invention.

FIG. 3 shows two battery cells 21a, 21b together with their associated bypass circuit modules 39a, 39b, connected in series, as they would be in a series of cells for a high reliability battery system. As shown, parallel connections 41a, 41e between adjacent battery cells provide protection against an open circuit failure in the connection. Each of the parallel connection wires 41a, 41b is sized to accommodate the maximum total current. It can also be noted that unless both a battery cell and its associated bypass circuit fail open, an electrical path is maintained through the cell series so that the remainder of the series remains usable.

Figure 4:
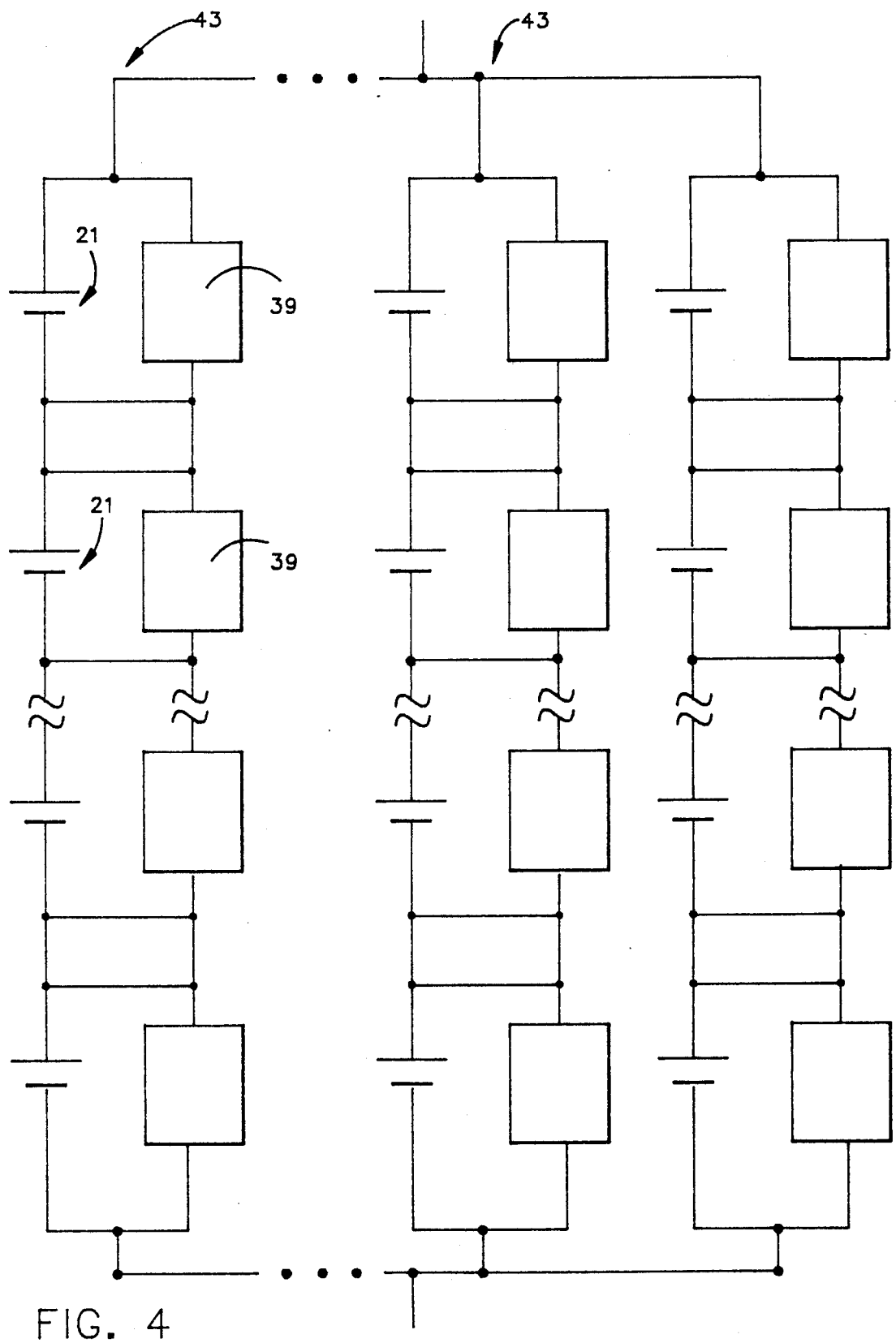
FIG. 4 is a schematic diagram of a high-reliability battery system incorporating the invention.

FIG. 4 shows a battery system including a plurality of parallel strings 43 of battery cells 21, with a bypass circuit 39 connected in conjunction with each cell. As can be seen, if any individual cells fails as an open circuit, the bypass circuit associated with that particular cell allows current to flow around the failed battery cell. This bypass permits the charging or discharging of other battery cells in that series, so that the series remains usable. A particular degree of expected reliability may then be obtained with fewer battery cells than was possible with the prior art, in which an open circuit failure of any cell in a series rendered the entire series unusable.

Of course, the failure of a particular cell in a series will reduce the voltage across the entire series. In addition, the diodes of the bypass circuitry around a failed cell contribute negatively to the voltage. Therefore, each series should have a sufficient number of cells to still provide an acceptable voltage level upon the failure of one or more cells. The percentage drop for the failure of any particular cell failure is less the more cells are included in the series.

In a preferred embodiment, the bypass circuit is fabricated in hybrid microelectronic technology. The bypass circuit may be packaged into any of a variety of small hermetic hybrid modules such as, but not limited to, conventional copper-based hybrid packages, or ceramic hybrid packages with fused (direct bond) copper technology. The ceramic materials may be alumina, beryllia, boron nitride, aluminum nitride, or other similar materials.

The use of one hermetic hybrid package eliminates the need for multiple diode packages and their associated interconnect hardware. Hybrid packaging also provides superior electrical and thermal performance.

Figure 5:
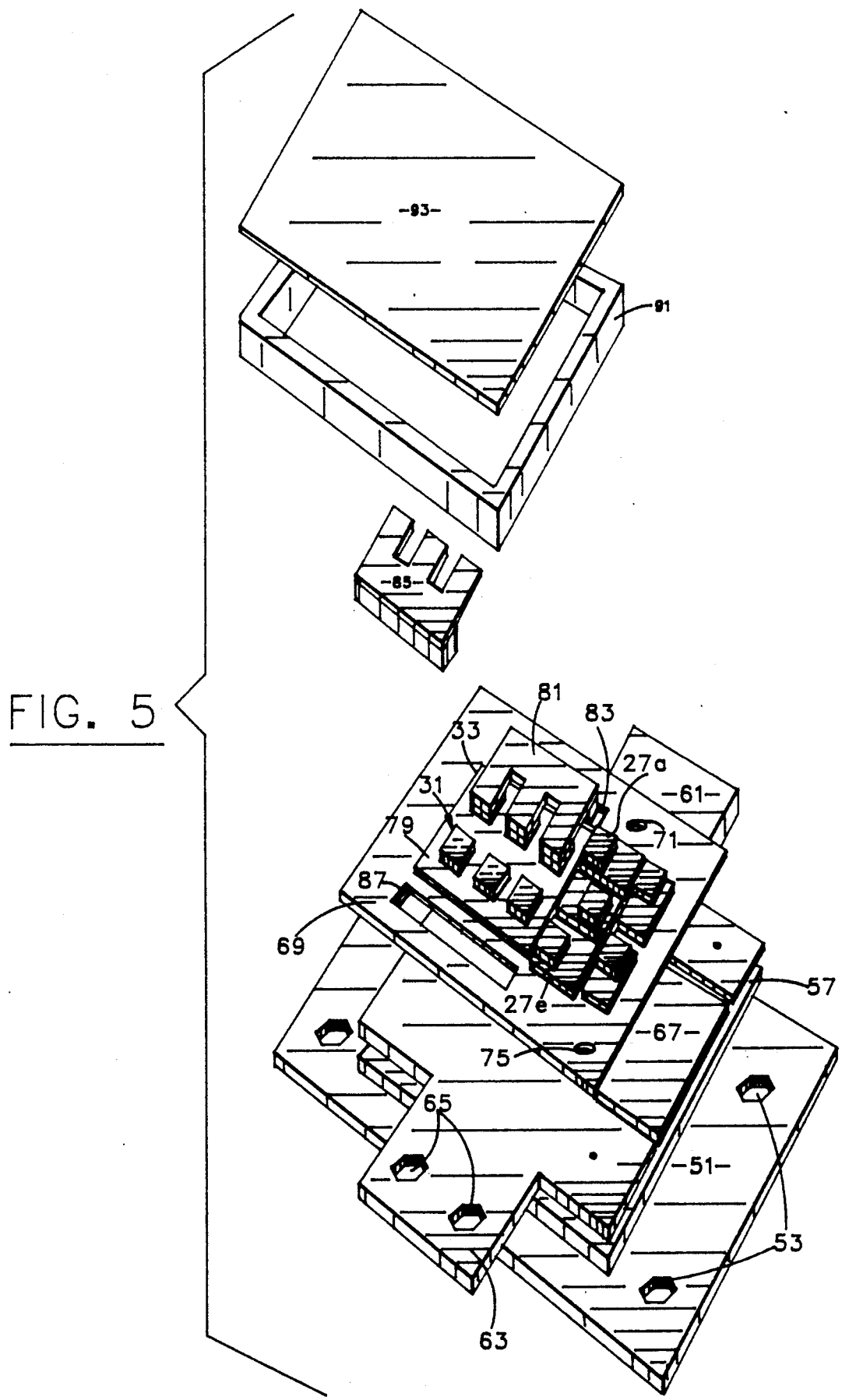
FIG. 5 is an exploded perspective view of a hybrid package containing battery cell bypass circuitry constructed according to the invention.
Figure 6:
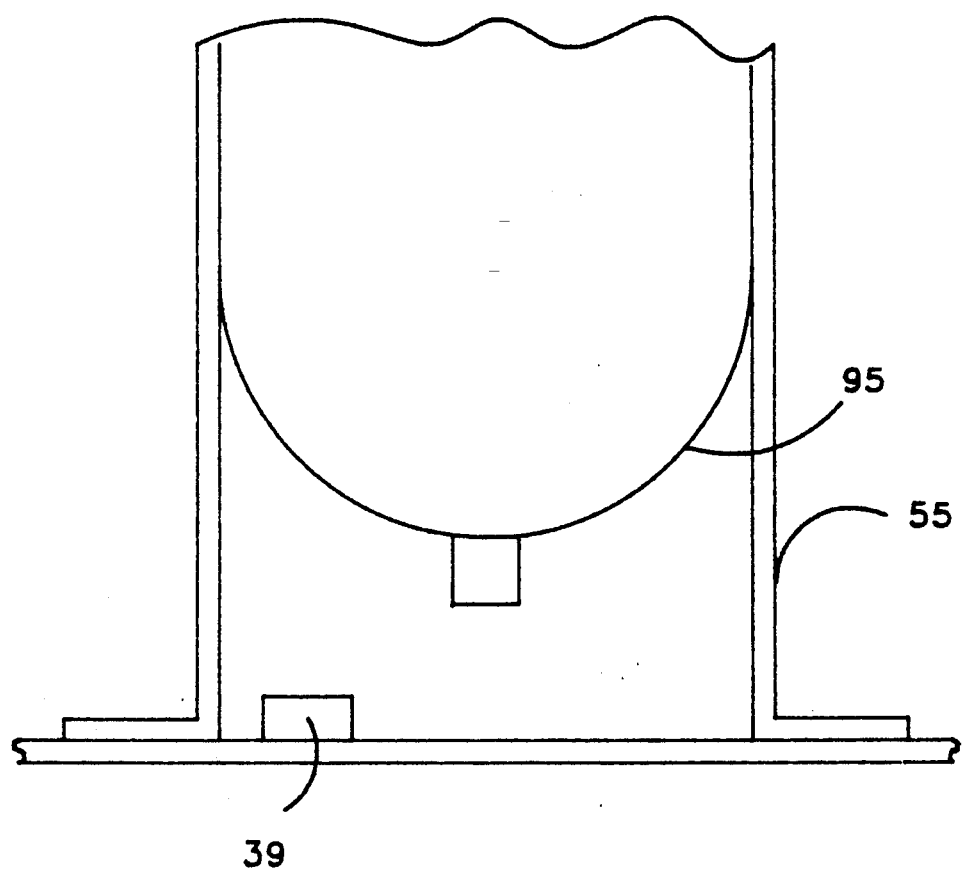
FIG. 6 illustrates a battery cell structure with a bypass circuit constructed according to the invention installed.

FIG. 5 is an exploded perspective view of an exemplary hybrid module incorporating the battery bypass circuit constructed according to the invention. A copper mount-down base plate 51 includes openings 53 for receiving screws or other attachment devices for mounting the entire hybrid module on a support structure, 55, as shown in FIG. 6. A ceramic layer 57 mounted on the base plate provides electrical insulation of the base plate. Two conductive terminals 61, 63 are provided on the ceramic layer, each having a protruding high-current bus bar. These terminals 61, 63 may be formed of a good conductive metal such as copper. Opening 65 may be provided in the bus bar for ready attachment of external electrical connections. The first metal bus bar 61 is for connection to the positive terminal of the associated battery cell, and the second bus bar 63 is for connection to the negative terminal of the cell. A thermal path to allow efficient removal of heat dissipated by the semiconductor die to the baseplate 51 is provided through a metal layer 67 (such as copper). A ceramic or other insulating layer 69 is mounted onto the metal terminals 61, 63 and the metal layer 67 between the metal battery cell terminals. The diodes and metallized mounting plate 79 of the bypass circuit are mounted onto this ceramic layer 69.

The five diodes 27a-27e of the charge bypass are connected in series with one another, with a connection (not shown) from the cathode of the first diode in the series 27a connected through an opening 71 in the ceramic layer 69 to a terminal 23 on the first metal bus bar 61, and the anode of the last diode of the series 27e connected through an opening 75 in the ceramic layer 69 to a terminal on the second metal bus bar 63.

An electrically conductive plate 79 is mounted onto the ceramic layer. The diodes 31, 33 for the discharge current from other cells are mounted onto this conductive layer 79 so that the conductive layer becomes the intermediate terminal 35 in the discharge bypass circuit (FIG. 2). In the illustrated embodiment in which two series sets of three parallel diodes are provided, three diodes 31 are provided with their anodes connected to the common plate 79, while the other three diodes 33 are provided with their cathodes connected to the common plate 79. A first conductor 81 is attached to the anodes of the second set of diodes 33, and passes through an opening 83 in the ceramic layer 69 to connect with the first metal terminal 61, which is for connection to the positive terminal of the battery cell. A second connection 85 through an opening 87 couples the cathodes of the diodes of the first set 31 to the second terminal for connection to the negative terminal of the battery cell.

A side wall 91 mounts over the structure, and a lid 93 is placed on top of the sidewall, and the entire assembly can be hermetically sealed. The structure illustrated may be made, for example, approximately 1.3 inches by 1.7 inches, thus taking little space.

A direct copper bond process may be used for sealing the sidewall 91 around the high current bus bar terminals 61, 63 protruding from the hybrid package module. Direct copper bond provides low thermal resistance, eliminate fragile glass seals that are necessary with certain other types of electrical connections, provide lower resistance copper strap for die attachments, and provides the shortest leads for lower impedance conductors to other circuitry.

Referring to FIG. 6, an exemplary installation of the bypass circuit hybrid package 39 is shown with a pressure vessel 95 for housing the battery cell. Preformed flexible wiring (not shown) is used to electrically connect the cell with the bypass circuit. This installation provides an efficient heat flow path from the battery area, and particularly from the bypass circuit module 39.

We claim:
1. A battery cell circuit comprising:
a battery cell having a positive terminal and a negative terminal;
a first plurality of diodes connected in series between said positive terminal and said negative terminal, wherein said diodes are connected with their forward direction from said positive terminal to said negative terminal;
a second plurality of diodes connected in parallel with each other between said negative terminal and said positive terminal, wherein said diodes of said second plurality are connected with their forward direction from said negative terminal to said positive terminal.

2. The battery cell circuit of claim 1, additionally comprising:
   an intermediate terminal, wherein said second plurality of diodes is connected between said negative terminal and said intermediate terminal; and
   a third plurality of diodes connected in parallel with each other between said intermediate terminal and said positive terminal, wherein said diodes of said third plurality are connected with their forward direction from said intermediate terminal to said positive terminal.

3. The battery cell circuit of claim 2, wherein said second and third plurality of diodes are Schottky diodes.

4. The battery cell circuit of claim 2, wherein:
   said diodes of said first plurality of diodes are p-n junction diodes; and
   said diodes of said second and third pluralities of diodes are Schottky diodes.

5. A high reliability battery system having a first battery system terminal and a second battery system terminal, the battery system comprising:
   a plurality of battery cells, each having a positive terminal and a negative terminal, wherein said battery cells are connected in series between said first battery system terminal and said second battery system terminal;
   a plurality of bypass circuits, wherein each of said bypass circuits has a first terminal connected to the positive terminal of a corresponding battery cell, and a second terminal connected to the negative terminal of said corresponding battery cell, wherein each of said bypass circuits comprises:
   a first plurality of diodes connected in series between said positive terminal and said negative terminal, wherein each of said first plurality of diodes are connected with their forward direction from said positive terminal to said negative terminal;
   a second plurality of diodes connected in parallel with each other between said negative terminal and an intermediate terminal, wherein each of said diodes of said second plurality has its cathode connected to said negative terminal and its anode to said intermediate terminal; and
   a third plurality of diodes connected in parallel with each other between said intermediate terminal and said positive terminal, wherein each of said diodes of said third plurality has its cathode connected to said intermediate terminal and its anode connected to said positive terminal.

6. The battery system of claim 5, additionally comprising:
   a second set of battery cells connected in series between said first battery system terminal and said second battery system terminal; and
   a second set of bypass circuits, wherein each of said bypass circuits of said second set has a first terminal connected to the positive terminal of a corresponding battery cell, in said second set of battery cells, and a second terminal connected to the negative terminal of said corresponding battery cell, wherein each of said bypass circuits comprises:
   a first plurality of diodes connected in series between said positive terminal and said negative terminal, wherein said diodes are connected with their forward direction from said positive terminal to said negative terminal;
   a second plurality of diodes connected in parallel with each other between said negative terminal and an intermediate terminal, wherein said diodes of said second plurality are connected with their forward direction from said negative terminal to said intermediate terminal; and
   a third plurality of diodes connected in parallel with each other between said intermediate terminal and said positive terminal, wherein said diodes of said third plurality are connected with their forward direction from said intermediate terminal to said positive terminal.

7. An electrical bypass circuit for connection in parallel with a battery cell having a positive terminal and a negative terminal, wherein the bypass circuit is packaged in a single hybrid package, said bypass circuit comprising:
   a first metal terminal for connection to said positive terminal of said battery cell;
   a second metal terminal, electrically isolated from said first metal terminal, for connection to said negative terminal of said battery cell;
   a first plurality of diodes mounted on an electrically insulating base so that said diodes are connected in electrical series, and the cathode of the first diode in said series is connected through said insulating base to said first metal terminal, and the anode of the last diode in said series is connected through said insulating base to said second metal terminal, wherein said diodes are connected with their forward direction from said first terminal to said second terminal;
   a common metal terminal mounted on said electrically insulating base;
   a second plurality of diodes, each mounted on said common metal terminal so that its anode is connected to said common metal terminal;
   a third plurality of diodes, each mounted on said common metal terminal so that its cathode is connected to said common metal terminal;
   a first metal connector coupling the anodes of said third plurality of diodes and said first metal terminal; and
   a second metal connector coupling the cathodes of said second plurality of diodes and said second metal terminal.

* * * * *